(12) United States Patent
Winkler (10) Patent No.: US 9,604,782 B2
(45) Date of Patent: Mar. 28, 2017

(54) SEMI-AUTOMATIC AND/OR FULLY-AUTOMATIC ORDER-PICKING SYSTEM

(76) Inventor: Walter Winkler, Parkstein (DE)

( * ) Notice: Subject to any disclaimer, the term of this patent is extended or adjusted under 35 U.S.C. 154(b) by 18 days.

(21) Appl. No.: 12/857,098

(22) Filed: Aug. 16, 2010

(65) Prior Publication Data

US 2011/0058926 A1 Mar. 10, 2011

Related U.S. Application Data

(60) Provisional application No. 61/234,422, filed on Aug. 17, 2009.

(30) Foreign Application Priority Data

Aug. 17, 2009 (DE) .................. 10 2009 026 386

(51) Int. Cl.
*B65G 1/137* (2006.01)
*B65G 1/04* (2006.01)

(52) U.S. Cl.
CPC ......... *B65G 1/1375* (2013.01); *B65G 1/0485* (2013.01)

(58) Field of Classification Search
CPC .................................................. B65G 1/1375
USPC ............... 414/807, 276, 267–269, 272, 281; 700/216
See application file for complete search history.

(56) References Cited

U.S. PATENT DOCUMENTS

| | | | | |
|---|---|---|---|---|
| 3,908,800 A * | 9/1975 | Drapeau | | 186/56 |
| 4,298,099 A * | 11/1981 | Isaacs | | 186/58 |
| 4,527,937 A * | 7/1985 | Tomasello, Jr. | | 414/273 |
| 4,678,390 A * | 7/1987 | Bonneton et al. | | 414/282 |
| 5,000,643 A * | 3/1991 | Tanaka et al. | | 414/267 |
| 5,269,646 A * | 12/1993 | Focke | | B65H 19/12 414/788.4 |
| 5,286,157 A * | 2/1994 | Vainio | | B65G 1/0414 414/273 |
| 5,582,497 A * | 12/1996 | Noguchi | | 414/281 |
| 5,903,464 A * | 5/1999 | Stingel, Jr. | | B65G 47/5109 198/347.1 |
| 6,450,751 B1 * | 9/2002 | Hollander | | 414/268 |
| 6,602,037 B2 * | 8/2003 | Winkler | | 414/273 |
| 7,097,045 B2 * | 8/2006 | Winkler | | B65G 1/1378 209/630 |
| 8,032,249 B1 * | 10/2011 | Shakes et al. | | 700/216 |
| 8,480,347 B2 * | 7/2013 | Schafer | | 414/281 |
| 8,489,228 B2 * | 7/2013 | Christ et al. | | 700/214 |
| 8,707,658 B2 * | 4/2014 | Schafer | | 414/267 |
| 8,827,619 B2 * | 9/2014 | Schafer | | 414/268 |
| 8,851,827 B2 * | 10/2014 | Burgstaller et al. | | 414/807 |
| 2003/0002971 A1 * | 1/2003 | Gibson | | 414/663 |
| 2003/0155731 A1 * | 8/2003 | Ditges et al. | | 280/47.35 |
| 2004/0131451 A1 * | 7/2004 | Winkler | | 414/278 |
| 2004/0220694 A1 * | 11/2004 | Stingel et al. | | 700/216 |

(Continued)

FOREIGN PATENT DOCUMENTS

DE 102007011856 A1 * 9/2008
DE 102012016552 A1 * 2/2014 .......... B65D 1/1375

(Continued)

*Primary Examiner* — James Keenan (74) *Attorney, Agent, or Firm* — Price Heneveld LLP (57) ABSTRACT

The present invention relates to a semi-automatic and/or fully automatic order-picking system and a corresponding apparatus and a method which facilitates efficient order picking at low technical outlay.

17 Claims, 3 Drawing Sheets

(56) References Cited

U.S. PATENT DOCUMENTS

| | | | |
|---|---|---|---|
| 2005/0238465 A1* | 10/2005 | Razumov | 414/273 |
| 2005/0281641 A1* | 12/2005 | Maynard et al. | 414/273 |
| 2010/0262278 A1* | 10/2010 | Winkler | B65G 1/1378 700/218 |
| 2010/0322747 A1* | 12/2010 | Lert et al. | 414/273 |

FOREIGN PATENT DOCUMENTS

| | | | |
|---|---|---|---|
| EP | 1136395 | 9/2001 | |
| EP | 2602213 A1 * | 6/2013 | B65D 1/1375 |
| WO | WO 96/11156 A1 * | 4/1996 | B65G 1/1375 |

\* cited by examiner

SEMI-AUTOMATIC AND/OR FULLY-AUTOMATIC ORDER-PICKING SYSTEM

CROSS-REFERENCE TO RELATED APPLICATION

This application claims priority to U.S. Provisional Patent Application No. 61/234,422, filed Aug. 17, 2009, the entire contents of which are hereby incorporated herein by reference.

FIELD OF THE INVENTION

The present invention relates to an apparatus and a method for semi-automatic and/or fully-automatic order picking.

BACKGROUND OF THE INVENTION

The prior art discloses various order-picking systems for compiling various goods in a shipping and/or packaging unit, which will be referred to below as a outbound unit. The known order-picking systems differ in the proportion of manual and automated activities, that is, regarding the degree of automation, and the attainable goods throughput and efficiency. Thus, fully automated order-picking systems are already known which, however, in certain circumstances due to the high necessary investment, are capable of economic operation only when a large number of different goods are picked and there is a corresponding throughput of goods to be picked. Accordingly, there are still many systems which entail a plurality of manual tasks, with the employees in the order-picking system being exposed to different loads, but which loads should generally be kept low. The work places for manual activities especially need to be configured ergonomically. In addition, there is a need to increase the efficiency of both fully automated systems and semi-automated systems.

SUMMARY OF THE INVENTION

From a first aspect of the invention, an order-picking system can employ an apparatus with at least one rack, the rack being stocked in automated mode from one side, while the other side is used for retrieval of the goods for picking, that is, for assembling a corresponding outbound unit. The at least one rack of the order-picking apparatus thus comprises a first side, which is referred to as the storage side, from which the rack is stocked in fully automated mode with goods, while the opposite side of the rack, that is, a second side, is called the picking front, is where goods are removed in order that they may be arranged on a load carrier for the picked goods, so as to form an outbound unit consisting of the picked goods.

According to another aspect of the present invention, an order-picking system can be configured so as to be semi-automatic and/or fully-automatic, depending on whether the goods are removed on the picking front in fully automated or semi-automated mode. In this connection, systems can be realized which remove either in fully automated mode or only semi-automated mode. In addition, however, hybrid concepts comprising a mix of fully or semi-automated retrieval are possible. The choice of whether an automated or semi-automated version or corresponding hybrid forms are used depends on the picking task to be done. Accordingly, a permanently installed order-picking system for a particular task can also be created, or the order-picking system can be flexibly designed for use in various applications.

For example, a combination of fully automated storage of goods in an order-picking warehouse or racking with fully and/or semi-automated retrieval of the goods from the order-picking warehouse or racking be realized, wherein provision is made in the case of fully automated storage of goods for fully automated depalletization or, more generally, separation of the goods from a shipping and packaging unit of the delivered goods, hereinafter also referred to as an inbound unit.

The starting point for this is a system for picking goods located in racking or shelf stocks, as described in European patent EP 1136395 B1. As corresponding components of this system can also be used in an aspect of present invention, the entire disclosure of that patent (EP 1136395 B1) is included herein by reference. In this system, whole inbound units, for example, pallets of single-type goods, are stored in racking or shelves, wherein the goods are removed from the racking in semi-automated mode with a special picker vehicle and stacked on a load carrier, such as a pallet or roll container, to form an outbound unit. The storing side (storage side) and the picking front of the racking are separated from each other, such that storage and retrieval operations can be performed independently of each other and without mutual interference. The picker vehicle in EP 1136395 B1 makes provision for a work place for an operator to retrieve the goods and stack them on the load carrier, which is also located on the picker vehicle. The picker vehicle is ergonomically optimised and is accordingly known as an EPM (Ergonomic Picking Machine or Ergonomic Picking Mobile).

Compared with this system, an aspect of the present invention is to go one step further, in that fully automated stocking of the goods into the racking occurs, wherein the goods are separated via a depalletizer and the stock-keeping units generated by this are each placed in assigned rack locations in the racking.

Depalletizing and thus separation of the products of large inbound units, comprising a plurality of usually identical goods combined into a large unit, makes it possible to reduce the size of the storage units. In this way, all goods or at least a majority of the goods to be picked can be placed in a narrowly defined area of the warehouse, such that the picker vehicle does not need to travel long distances. Furthermore, this creates the possibility for a single picker vehicle to pick a full order, without the load carrier on which the outbound unit is being compiled having to be transferred from one picker vehicle to the other picker vehicle or in any other manner to a different section of the warehouse by materials handling devices.

Fully automated storage greatly increases the level of automation, although the total cost of automation can be kept low so that the benefit-cost ratio is very advantageous. In this regard, the stock-keeping units in their respective packaging can be handled in the apparatus as individual items or sales units or arranged in the apparatus for further handling on or in carriers, with the carriers possibly comprising trays, boxes or containers. The arrangement of the stock-keeping units on corresponding carriers is provided in particular for those goods which, on account of their shape, are difficult for an automated system to handle, such as bags and the like. Several stock-keeping units can also be arranged on one carrier, more precisely beside and/or on top of one another.

Where reference is made below to stock-keeping units, it is also understood to refer to those which are on carriers, such as trays, with smaller units of a few stock-keeping units capable of being grouped together, e.g. 10, 5 or 3 stock-keeping units. However, it is possible for just a single good to be arranged on a carrier. In an aspect of the present invention, a stock-keeping unit can thus refer to a single item, such as a cardboard box or a bottle crate, with a corresponding individually manageable object, such as the cardboard box, in turn capable of containing several items. In like manner, the carriers, which can comprise one or more objects and be stored in the rack for picking, can also be regarded as stock-keeping units. Compared with the non-depalletized inbound units, these have the advantage of being smaller compared with these inbound units in their dimensions, at any rate in at least one dimension. This reduces the storage space for the order-picking rack or warehouse and the so-called picking front, i.e., the retrieval side, is kept small.

In an aspect of the present invention, all or a large proportion of goods to be picked by the system can be stored as depalletized stock-keeping units in the warehouse of the order-picking apparatus. This ensures that all goods are stocked in units which are smaller than when they were received.

The depalletizing of the goods, i.e., generally the separation of the single-type goods delivered in a large packaging and shipping unit (inbound unit), therefore offers an advantage of enabling the racking to have smaller dimensions, such that part of the additional burden of depalletizing is compensated by savings on racking. To have sufficient goods in stock, buffer stores which have a simpler structure and, for example, do not offer an order-picking facility, can be provided in addition.

The warehouse which is used in an aspect of the present invention for picking the goods and which can also be described as a small-parts store, thus has appropriate storage spaces, in which only a few stock-keeping units are stored. In particular, the picking front of the store can have a storage location for each stock-keeping unit to be picked, with the storage location accommodating only a single stock-keeping unit. Only between the picking front and the storage side can be provided several storage spaces one behind the other, so that overall the picking front can have small dimensions, i.e., it corresponds in size to the minimum area yielded by the sum of the required locations for all stock-keeping units to be picked.

In addition, the storage can, as already described, take the form of racking or shelf stores, with racking surfaces arranged above and beside one another. However, other forms of storage such as flat storage, etc., are also conceivable.

The small dimensions of the storage make it possible for one picker vehicle to easily assemble one outbound unit.

Accordingly, in an aspect of the present invention, the separation of the goods and the stocking of stock-keeping units in the racking can offer the advantage that, due to the smaller dimensions of the respective rack locations and thus of the entire racks, the concatenation and coupling of the transport logistics on the picking front, i.e., in particular the interaction of different picker vehicles for the implementation of a picking process, can be eliminated, a fact which offers significant advantages in controlling the entire system, because control is considerably simplified.

In corresponding small parts racking, it is possible that, in a single rack or a single rack module or a picking channel in which at least one picker vehicle is moved, at least a majority of the goods which are to be picked are stocked or can be reached by a single picker vehicle, such that a single picker vehicle can complete a order-picking process or at least part of the process until a corresponding load carrier for accommodating the goods to be picked is full. In particular, at least roughly 80 percent, preferably at least roughly 90 percent, and in particular at least roughly 95 percent or all of the goods to be picked can be contained in one rack or rack module or removed from there by the picker vehicle, such that complicated and complex transfers of the load carrier, which accommodates the goods to be picked, from one picker vehicle to another picker vehicle or corresponding buffer or transfer areas and the relevant technical information processing of these processes can be eliminated. Since a plurality of picking processes can be accomplished with a few goods, it is possible in individual cases for a smaller proportion of the goods to be stored in a rack module or to be reachable by a picker vehicle. Thus, the number of goods which are stored in a rack module or which can be reached by a picker vehicle can depend on one picker vehicle being able to process in each case at least a certain number of all picking processes arising in the system, more precisely preferably at least about 80%, especially at least about 90%, most preferably at least about 95%.

A rack module is understood herein to be a module comprising at least one rack, at least one rack vehicle for stocking the rack with goods to be picked and at least one picker vehicle, with one picker vehicle being able to reach all rack locations or storage locations. Accordingly, for example, a second rack can be provided, which with the first rack forms a picking aisle or picking channel in which the picker vehicle moves linearly back and forth. Since each rack is loaded from a side (storage side) opposite the picking front, a second rack vehicle for stocking the rack can be assigned to the rack, with adjacent modules capable also of sharing a rack vehicle.

In addition, a replenishing rack can additionally be assigned to a rack module, such that the rack vehicle of the corresponding rack module can move quickly and easily to replenish the rack.

The apparatus can accordingly have multiple modules with multiple racks and several rack and picker vehicles.

As already mentioned above, the picker vehicle can have a storage and retrieval machine for the automated retrieval of the goods from the rack or storage. In a semi-automated embodiment, the picker vehicle can comprise a work space for an operator who manually removes the goods from the rack or storage and stacks them on the load carrier which has already been provided for the outbound unit on the picker vehicle.

The corresponding picker vehicle with an operator work place can be configured in accordance with the picker vehicles of EP 1136395 B1, such that the load carrier, on which the goods for the outbound unit are compiled, can be moved relative to the operator's work place, such that the corresponding stacking height can be adjusted to each operator, such that the working height for the operator is always ideal for stacking the goods on the load carrier of the outbound unit. In addition, a corresponding picker vehicle with a work place for one operator, but also a fully-automated picker vehicle with a storage and retrieval machine, is configured such that it not only can reach each of the adjacent storage locations by traversing along the rack, but also, by means of height adjustment, each of the storage locations on top of one other. Accordingly, the work place for the operator himself is also configured so as to be vertically adjustable.

During order picking, the operator can be supported by a pointing apparatus which indicates where the operator must place the goods retrieved from the rack on the load carrier or on a stack formed thereon. As a result, the system control unit or the corresponding information technology system which controls the picking and thus the corresponding apparatus can ensure optimal load distribution on the load carrier. In addition, a high picking rate can be achieved very quickly with unskilled workers.

The control of the apparatus or the order-picking system can proceed by a data processing system on which corresponding control programs are running.

During depalletizing, in which the delivered single-type goods are removed from corresponding inbound units, such as EU pallets, provision may additionally be made for a device for arranging the goods on a load carrier for transportation from the depalletizing station to the small-parts store and/or for the storage of the stock-keeping units in the rack or store. This can apply to such goods whose handling is inherently difficult to automate due to their nature, such as their shape and the like. The load carriers can be formed by any suitable shape of load carrier, such as trays, which can be loaded in single layers or multiple layers, in which the goods are arranged side by side and/or above each other, and so-called single trays in which only a single object is arranged on a tray. Moreover, vessels, such as boxes, containers and the like, are conceivable, as are pallets, half pallets and quarter pallets. Where pallets, such as EU standard pallets, are used for storage in a small-parts store, it is only necessary for a reduction to occur in the inbound unit, that is, e.g., from double-deck pallets to individual EU pallets. However, preference is given to storage of the goods as actual stock-keeping units, as the resultant space requirement is very small.

From the depalletizing station to the store or rack, the separated stock-keeping units can be moved by a materials handling device and are finally transferred to the rack vehicle, which stores them in the appropriate locations. This is controlled by the control unit of the apparatus or of the order-picking system, which also records and saves which goods are stored in which storage location. However, the occupancy of the rack can be dynamically altered by the control unit, and hence adjusted to the requirements of the order-picking system.

The materials handling device used from the depalletizing station to the rack vehicle can take the form of continuous and/or discontinuous materials handling, it being understood that continuous handling refers to such systems which execute continuous movement, such as circulating belt conveyors, roller conveyors and the like. In the case of discontinuous materials handling, a discontinuous, for example, repeated, step-wise movement is executed, such as a movement on pushing cars, especially cross-pushing cars and the like.

Through designing the materials handling device used between the depalletizing station and the rack vehicle in the form of positive guidance of the goods and keeping the travel distance short without branches or positive guidance and the like, direct target tracking of the goods by corresponding identification stations can be dispensed with, so that the apparatus can pick diverse and different products. Therefore, indirect target tracking only is needed on the travel distance between depalletizing station and small-parts rack, as the control unit can transmit the information as to which products are currently being separated at the depalletizing station, so that the control unit is able to record the exact storage locations of the corresponding stock-keeping units. As it only remains to record the storage location to which the rack vehicle has navigated and stocked, recording of the information as to which goods are stored in which rack locations is very simple. In indirect target tracking, therefore, precise identification of the goods is not necessary, but rather it is merely necessary to record whether the previously known goods have travelled the specified travel distance. This is easily effected by simple means, such as counting barriers and the like. Thus, the overall system can be simplified.

During retrieval, the picked goods are arranged on a load carrier carried on the picker vehicle. The load carrier can be formed by any suitable load carrier, such as pallets, EU pallets, EU half-pallets, EU quarter pallets, roll containers, single containers, multiple containers, which are arranged on container boards or in transport racks, and the like.

In addition, combinations of load carriers can be provided, so that initially corresponding goods can be stored and stacked directly on a first base load carrier, while thereafter an additional smaller load carrier, such as an EU half-pallet or EU quarter-pallet or any other trays are arranged, on which smaller picked goods can then be placed. The order in which such second load carriers or intermediate carriers may be used is determined by the vagaries of the goods and the picking order. Thus, the second load carriers or intermediate carriers with their goods can initially be stacked on the first load carrier, i.e., in the lower part of the stack, or at the end of picking, i.e., in the top part of the stack. In addition, intermediate stacking is also conceivable, i.e., in a central region of the stack.

Correspondingly in an inventive apparatus for order picking goods, not only can different load carriers find application, but these different load carriers can also find application in a single order-picking process.

These and other features, advantages and objects of the present invention will be further understood and appreciated by those skilled in the art by reference to the following specification, claims and appended drawings.

BRIEF DESCRIPTION OF THE DRAWINGS

Further advantages, characteristics and features of the present invention will become clear in the following detailed description of an embodiment with reference to the accompanying drawings. The drawings show in purely schematic form in.

DETAILED DESCRIPTION OF THE PREFERRED EMBODIMENT

Figure 1:
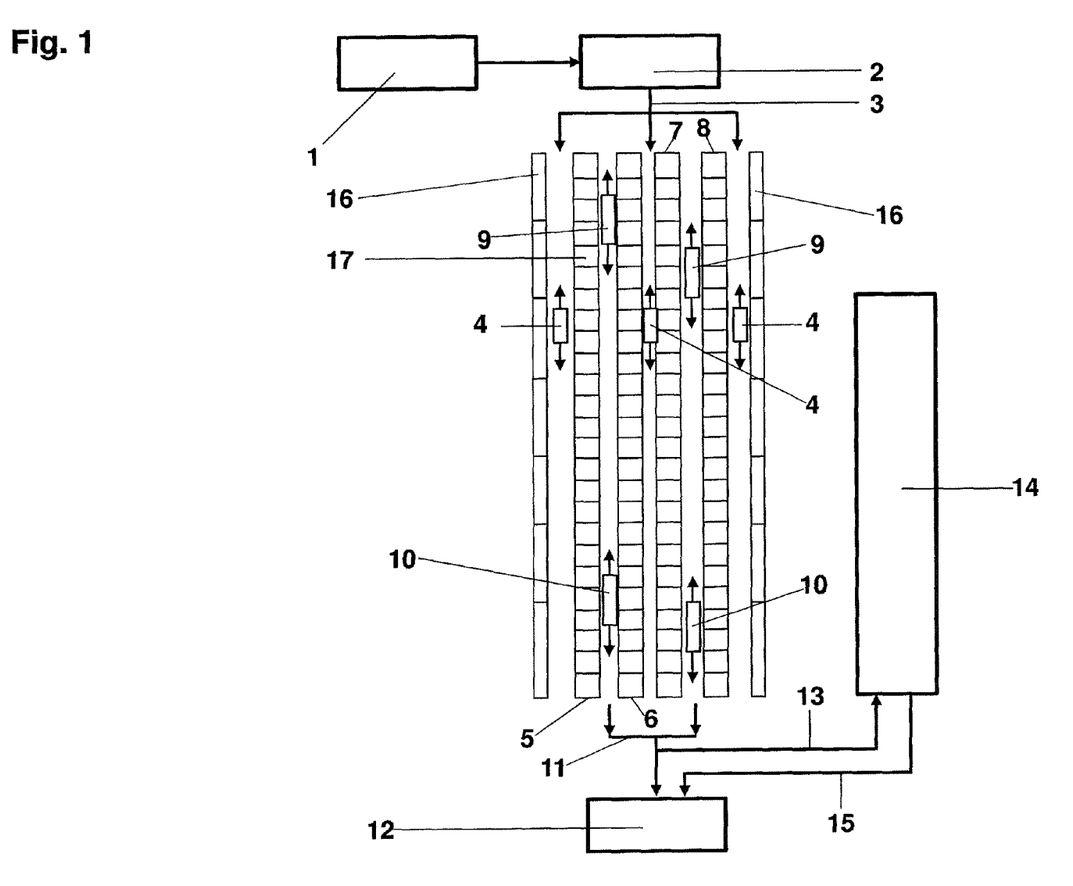
FIG. 1 is a schematic diagram of an inventive apparatus.

FIG. 1 shows a schematic diagram of an aspect of the inventive apparatus.

The apparatus comprises incoming goods 1 where the goods to be picked are delivered in large packaging and shipping units, which are called inbound units. The inbound units are recorded as incoming goods in an information technology system employing corresponding data processing equipment and software, and, where appropriate, the packaging material that surrounds the inbound unit, such as shrink film and wrapping film, is removed. Usually, the inbound units are delivered on pallets, for example, EU standard pallets. The inbound units comprise single-type goods, i.e., items of the same type that are present individually or in small sales units. These individual goods or sales units are hereinafter referred to as stock-keeping units.

From incoming goods 1, the stock-keeping units are transported to a depalletizer 2, which separates the inbound units with their plurality of stock-keeping units. In this connection, the stock-keeping units, as individual items or sales units, can be further treated in their respective packaging in the apparatus or be placed on or in carriers for further processing in the apparatus, the carriers comprising trays, boxes or containers. The arrangement of the stock-keeping units on corresponding carriers is provided in particular for those goods which, on account of their shape, are difficult for an automated system to handle, such as bags and the like. It is also possible for several stock-keeping units to be arranged on one carrier. In the following, where reference is made to stock-keeping units, this is also understood to refer to those which are arranged on carriers, such trays.

The goods separated by the depalletizer 2 are conveyed by materials handling device 3 to racking, where they are transferred to automated rack vehicles 4. The rack vehicles 4 move in supply channels along racks, which can especially be called order-picking racks 5, 6, 7, 8. The order-picking racks 5, 6, 7, 8 have a plurality of rack locations, which are arranged side by side and one above the other and into which the separated goods can be placed in fully automated mode by the rack vehicles 4. FIG. 1 shows a plurality of rack locations 17 side by side in the order-picking racks 5, 6, 7, 8.

The racking is designed such that, on one side of every order-picking rack 5, 6, 7, 8, a supply channel with a corresponding rack vehicle 4 is provided, while, on the opposite side, which is the order-picking side, a picking channel is provided, along which at least one picker vehicle 9 moves. In the embodiment shown, two picker vehicles 9, 10 are shown for each picking channel.

While the rack vehicle 4 moves along order-picking rack 5 or 6 or 7 or 8 in the supply channel and, by means of a corresponding stroke, can also access the rack locations 17 arranged on top of one another and thus supply each rack with corresponding goods, on the picking front of the corresponding rack 5, 6, 7, 8, 9 is provided a picker vehicle 9 or 10, which can also move along the racks 5, 6, 7, 8 and also, by means of a corresponding stroke or height adjustment, can access the rack locations 17 arranged one above the other. The rack locations 17 are configured such that they pass through the rack 5, 6, 7, 8, such that the goods which the rack vehicle 4 places in the rack location 17 on one side can be retrieved from the other side. In order that the goods in rack location 17 may be moved more easily from one side to the other, the rack locations can, for example, be equipped with roller conveyors and inclined or be equipped with an appropriate pulling or pushing device, so that the goods can be moved towards the side on which the picker vehicle is moving, i.e., the order-picking side. However, the rack locations 17 can also be configured as simple, flat storage locations.

The storage locations 17 can be configured such that several identical goods are arranged one behind the other in the rack locations.

As indicated in the embodiment in FIG. 1, each picking channel is provided with picker vehicles 9 and 10, whereas only one rack vehicle 4 is arranged in the supply channel. However, several rack vehicles 4 can be provided in a supply channel and only one or more than two picker vehicles in the picking channel.

One of the racks 5, 6, 7, 8, one of the rack vehicles 4 and one of the picker vehicles 9, 10 form a module. The apparatus can accordingly have several modules, with several modules capable of sharing corresponding picker vehicles 9, 10 and rack vehicles 4. The embodiment shown in FIG. 1 has, for example, four modules, wherein the first module comprises the rack vehicle 4, the rack 5 and the picker vehicles 9 and 10. The second module with rack 6 shares the picker vehicles 9, 10 with the first module and shares the rack vehicle 4 with the third module, which is formed by the rack 7, while the third module, in turn, shares picker vehicles 9 and 10 with the fourth module, which is formed by the rack 8.

As shown in FIG. 1, two picker vehicles 9, 10 are arranged in a picking channel, with two picker vehicles 9, 10 arranged such that they can move along the entire length of the adjacent racks 5, 6, 7, 8, such that they can each reach rack location 17 of the corresponding racks 5, 6, 7, 8. Accordingly, for example, the picker vehicle 10 is shown in its outermost position in the picking channel between racks 5 and 6, such that the other picker vehicle 9 can be moved as far as the outermost edge of racks 5 and 6.

At the lateral edges of the racking are arranged replenishing racks 16, which can be served by the rack vehicles 4 and are used for holding goods for replenishing the order-picking racks 5, 6, 7, 8. In addition, other storage areas (not shown) can be provided, in which corresponding goods can be stockpiled. These stores can contain both inbound units and already separated goods and be connected via appropriate materials handling either with incoming goods 1 or directly with the racking, such that the goods can be transferred directly to the rack vehicles 4.

The picker vehicles 9, 10 are configured such that they carry an operator and a load carrier for the goods to be picked. Whereas, storage of the goods proceeds in fully automated manner via depalletizing 2, materials handling device 3 and the rack vehicles 4, retrieval of goods from the rack locations 17 is semi-automated. In this semi-automated method, the operator need only retrieve the corresponding goods, the number of which, for example, is shown to him on a display, from the rack locations and stack them on the load carrier. The journey of the picker vehicle 9, 10 to the rack locations 17 and the display of the goods to be picked are automated and predefined by the information technology system or a system control unit, which controls the workflow according to a picking order.

Figure 2:
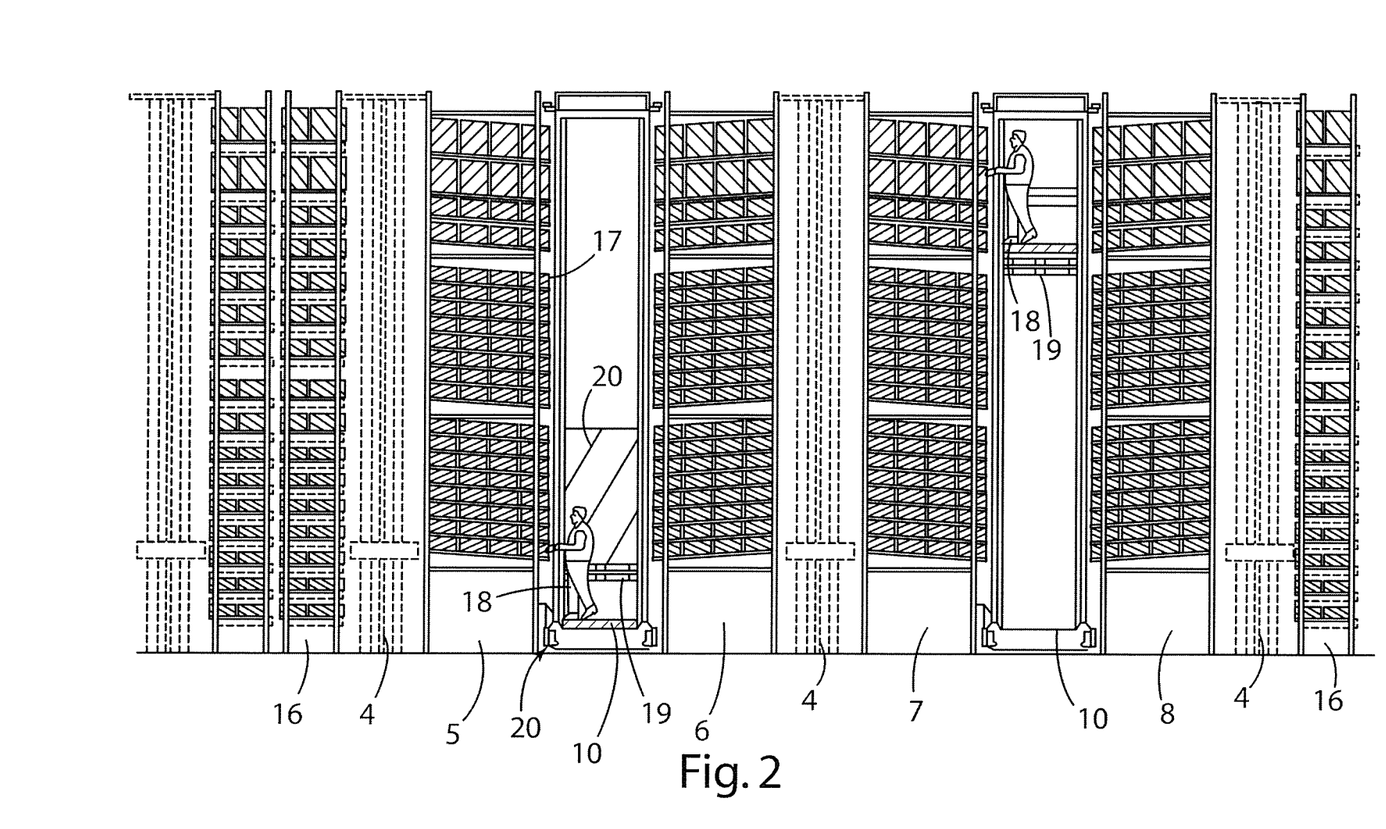
FIG. 2 is a side view of the racking of the inventive apparatus.

The structure of a corresponding picker vehicle is best seen from FIG. 2. It shows a corresponding picker vehicle 10 in side view.

The picker vehicle 10, for example, has a rail arrangement which permits the picker vehicle 10 to move along the racks 5, 6, 7, 8. In addition, the picker vehicle 10 has a frame 11 arrangement in which are provided a first platform for an operator 18 and a second platform on which a load carrier 19 for the goods to be picked is arranged. The platforms are vertically adjustable, both absolutely and relative to each other. As is apparent from FIG. 2, the platform for the operator 18 in the picker vehicle 10 shown left in the diagram is arranged lower than the platform for the load carrier 19, such that the operator 18 can remove the goods 30 from a storage location 17 in an ergonomically simple manner and place it directly on the load carrier 19 (FIG. 3) or on a stack 31 already formed thereon (FIG. 4), without having to do lifting work. In the picker vehicle shown in the right of the diagram of FIG. 2, the situation is reversed; there, the platform of the operator 18 is already arranged higher than the platform of the load carrier 19, such that the operator 18, again without having to do lifting work, can place corresponding goods 30 from the storage location 17 on the stack 31 already formed on the load carrier 19.

Figure 3:
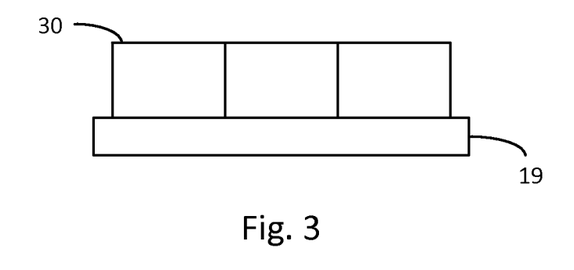
FIG. 3 is a schematic diagram of a first example of a load carrier with picked goods where the picked goods are stacked on top of the load carrier.
Figure 4:
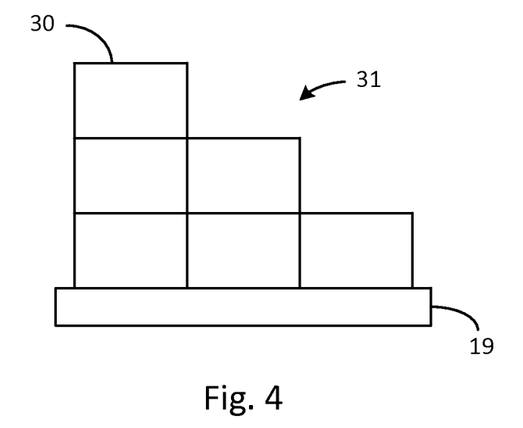
FIG. 4 is a schematic diagram of a second example of a load carrier with picked goods where the picked goods are stacked on top of the load carrier and on top of each other.

In the embodiment shown in FIGS. 2-4, the load carrier 19 is a pallet, such as an EU standard pallet. To facilitate proper stacking of the goods 30 on this pallet, a stacking container 20 open on one side can be provided, which serves as a support surface for better stacking of the goods. The stacking container 20, however, is not part of the pallet load formed by stacking.

To support pallet formation, a pointing apparatus (not shown) can be provided, which indicates where the next good should or must be stored on the pallet or already formed stack. The pointing apparatus can be formed by an emitter, which directs a beam of light onto the proposed stacking point, such as a laser, a projector with a focused beam of light or similar apparatus. In addition, the pointing apparatus can also generate a virtual image on the placement point that specifies precisely the position, orientation, alignment, size and shape of the object to be placed on the placement point. The information for this can be obtained from the stored data for the goods to be picked. The pointing apparatus is controlled via the information technology system or the system control unit, which, in accordance with the order to be picked, steers the picker vehicle to the corresponding rack locations 17, indicates to the operator, for example via a display, which goods to remove and in what quantity, and accordingly also controls the pointing apparatus so that the operator is shown how the individual goods are to be stacked or placed on the load carrier. In addition, the picker vehicle is ergonomically positioned, i.e., arranged in the correct position, in particular relative to the storage location from which the goods to be picked have to be removed. This especially concerns vertical adjustment of a lift cage of the picker vehicle, in which the operator or picker stands or sits and/or of the stacked pallet or the stack already arranged thereon, to the height of the storage location in which the goods to be picked are stored in order that easy transfer of the goods from the storage location to the picker vehicle may be facilitated, and more precisely without the need for lifting work.

The pointing apparatus can be arranged at any suitable place on the picker vehicle 9, 10. It is also possible for the pointing apparatus to be integrated into the display of the picker vehicle, where the operator can be shown the right location on a fictitious stack.

FIG. 2 also shows the floors of the storage area, which allow automatic replenishment of goods to the order-picking side of the racks 5, 6, 7, 8. Furthermore, FIG. 2 also shows the replenishing stores 16.

FIG. 1 further shows that the apparatus can comprise supplementary systems 14 or can interact with them. A supplementary system 14 is meant to include other storage and/or picking devices, which can be provided as supplements. For example, a certain small percentage of the goods to be picked may be sold very seldomly, such that a high degree of automation for picking this class of goods is not economically viable. In that case, the supplementary system could be a less automated order-picking system, such as a so-called car-picking system in which a car driven manually by one operator takes the load carrier for the goods to be picked, either with already picked goods or empty, to corresponding storage locations in order that the corresponding goods may be removed from the storage locations there. Here, therefore, the level of automation is reduced in that the manually operated car is not moved in automated mode to the corresponding storage locations like the picker vehicles 9 and 10, but rather by a human operator. To this end, the completed outbound units, i.e., units from the load carrier bearing the picked goods, which are transported from the racking, can be transported to the supplementary systems 14 via materials handling 11, via a corresponding branch 13 and either directly back into materials handling 11 via a transport path 15 or directly into an outgoing goods module 12. The outgoing goods module 12 can comprise, for example a film-wrapping station where the finished outbound units are wrapped in film to give them the necessary stability.

The load carriers which are empty and arranged in the picker vehicles 9, 10 and are then loaded with the appropriate goods to be picked can be formed by all sorts of suitable devices, such as regular EU standard pallets, other pallet-like carriers or containers, roll containers, and the like. The corresponding load carriers can be arranged on the picker vehicles 9, 10 individually or in pairs.

The apparatus is configured such that in each rack 5, 6, 7, 8, or in each supply channel, enough storage locations 17 are arranged to accommodate at least about 80 percent of all goods to be picked in the system, preferably at least about 90 percent, most preferably at least about 95 percent of all goods to be picked or all goods to be picked and/or so that at least about 80%, preferably at least about 90%, preferably at least about 95% of picking processes can be completed by each picker vehicle. Correspondingly, a picker vehicle 9, 10 can pick at least 80 percent, preferably 90 percent, especially 95 percent or all of the goods to be picked, such that one picker vehicle 9, 10 can complete an entire picking process, without the need for any transfer points or concatenation points.

Although the racks 5, 6, 7, 8 are shown as straight, vertical racks, in the form of racking, the storage locations 17 can be arranged in any form and manner, such as lying, with several racks stacked on above the other, with curved or angled picking channels, etc. In this case, a single picker vehicle can reach at least approx. 80 percent, preferably at least about 90 percent, especially at least about 95 percent or all the goods to be picked in order that, with this picker vehicle, a picking process or part of a picking process up to full loading of a load carrier may be completed.

The picking process proceeds in such a way that, after fully automated depalletization, which generally consists in separation of goods from the inbound unit, the goods are stored in fully automated mode in the racks 5, 6, 7, 8 via the materials handling device 3 and the rack vehicles 4 such that in each case a picker vehicle 9, 10 can reach all goods, but at least 80 percent, preferably 90 percent, especially 95 percent of the totality of goods to be picked. Accordingly, for a picking order, the information technology system specifies to the picker vehicle 9, 10, which locations 17 to navigate to, such that the operator on the picker vehicle 9 can remove the quantity of goods from the rack locations 17 that has been displayed to him and can stack them on the load carrier 19 provided on the picker vehicle 9. The information technology system specifies the sequence of goods to be stacked in succession in line with certain criteria which can be stored in the information technology system, such as weight, size of goods, etc. Furthermore, a pointing and/or projection apparatus can assist the operator by displaying the stacking position during the picking of a stack of mixed goods.

The picking order of the information technology system to the picker vehicle 9, 10 with its operator 18 comprises, for example, an order placed by a retail business to the wholesaler or a central distribution warehouse. The information technology system works out the picking sequence from the order and then guides the corresponding picker vehicle 9, 10 to the corresponding storage locations 17 where the operator 18 removes the goods and places them on the charge carrier provided, preferably as directed. If one load carrier is sufficient for the order process, the picking order is completed accordingly. If more than one load carrier is required, the picking order can be processed successively by one picker vehicle 9, 10 with multiple load carriers, or, the picking order is divided into parts equivalent to a full load carrier, such that various picker vehicles each form one complete load carrier, for example a fully stacked EU pallet.

Where the picking order comprises different goods that necessitate the use of additional load carriers for the purpose of improved stacking and which are different from the first load carrier and which can be described as intermediate carriers, then the picker vehicle 9, 10 with the operator 18 can move at an appropriate time, for example, at the start of the picking process or the end of the picking process, or even during the picking process, to a place in the rack module or the rack where corresponding intermediate load carriers (load carriers of the second kind) can be removed. These intermediate or second load carriers are then placed on the first load carrier or on goods already placed thereon, and then the operator 18 with the picker vehicle 9 can remove suitable goods for the intermediate or second load carrier from the rack and then continue or terminate the picking process.

The empty load carriers, which remain in the rack locations during picking of the stock-keeping units from the rack locations 17, can either be removed from the racks by the picker vehicle 9, 10 or the rack vehicle 4.

Although the present invention has been described in detail using the enclosed embodiments, it is obvious to a person skilled in the art that the invention is not limited to these embodiments, but rather that modifications are possible in which some characteristics can be left out or other combinations of characteristics can be made, without departing from the protective scope of the attached claims. In particular, the present invention claims all combinations of all presented characteristics.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. An order-picking apparatus comprising:
a depalletizing station which fully automatically separates all goods from an inbound unit into stock-keeping units;
at least one rack;
a materials handling device for automatically conveying the stock-keeping units from the depalletizing station;
a fully automatic rack vehicle on a first side of the at least one rack, the rack vehicle receiving the stock-keeping units from the materials handling device and automatically storing the stock-keeping units in the at least one rack, wherein the materials handling device and the rack vehicle are configured such that the stock-keeping units are automatically transferred from the materials handling device to the rack vehicle, wherein the stock-keeping units are transported from the depalletizing station to the at least one rack without being identified by identification stations between the depalletizing station and the at least one rack;
at least one picker vehicle carrying at least one load carrier of an outbound unit for assembling different picked goods in the outbound unit with the at least one picker vehicle being designed to carry the outbound unit with a plurality of picked goods, the at least one picker vehicle being arranged on a second side of the at least one rack, the second side being opposite the first side with the rack vehicle; and
an information technology system which is programmed to work out a picking sequence from an order and then guide the at least one picker vehicle to corresponding storage locations of the at least one rack and wherein the information technology system specifies the sequence of goods to be stacked in succession on the at least one load carrier to form the outbound unit, wherein the at least one picker vehicle comprises a platform on which the at least one load carrier for the goods to be picked is arranged and which is designed such that the picked goods are arranged on the at least one load carrier or a stack already formed on the load carrier carried on the at least one picker vehicle during a journey of the at least one picker vehicle to the storage locations in the at least one rack in a picking process.

2. The apparatus in accordance with claim 1, wherein:
the order-picking apparatus is at least one of semi-automatic and fully automatic, wherein, in a semi-automatic configuration, the goods are retrieved manually from a picking front, whereas, in a fully automatic configuration, the goods are retrieved in an automated manner by the at least one picker vehicle.

3. The apparatus in accordance with claim 1, wherein:
the at least one picker vehicle is configured for at least one operator, who transfers the goods from the at least one rack onto the at least one load carrier for order-picked goods.

4. The apparatus in accordance with claim 1, wherein:
the at least one picker vehicle comprises a storage and retrieval machine for automated retrieval of the goods from the at least one rack.

5. The apparatus in accordance with claim 1, wherein:
one of the at least one racks with the one rack vehicle and the at least one picker vehicle forms a first rack module.

6. The apparatus in accordance with claim 5, further including:
a second rack module comprising a second one of the at least one racks and a second rack vehicle.

7. The apparatus in accordance with claim 5, wherein:
the rack module additionally comprises a replenishing rack.

8. The apparatus in accordance with claim 5, wherein:
several modules with several racks and several rack and picker vehicles are provided.

9. The apparatus in accordance with claim 1, wherein:
the apparatus is designed to pick a totality of goods or to carry out a number of picking processes and the at least one rack has a number of storage spaces, which are accessible from the at least one picker vehicle, wherein the number of storage spaces corresponds to at least 80% of the totality of goods to be picked or is chosen such that at least 80% of the number of picking processes can each be accomplished by one picker vehicle.

10. The apparatus in accordance with claim 1, wherein:
the at least one rack comprises several storage spaces for identical stock-keeping units one behind the other from the first side to the second side.

11. The apparatus in accordance with claim 1, further comprising:
a supplementary system for picking a proportion of goods to be picked.

12. The apparatus in accordance with claim 1, wherein:
the at least one picker vehicle automatically moves to a picker position for picking a desired good from the at least one rack.

13. A method of order-picking comprising:
a) automatically depalletizing all goods of an inbound unit into stock-keeping units;
b) automatically transporting the stock-keeping units to storage locations in a rack by a materials handling device for automatically conveying the stock-keeping units from the depalletizing station and by a fully automatic rack vehicle being located on a first side of the rack, the rack vehicle receiving the stock-keeping units from the materials handling device and automatically storing the stock-keeping units in the rack, wherein the stock-keeping units are automatically transferred from the materials handling device to the rack vehicle, and wherein the stock-keeping units are transported from the depalletizing station to the rack without being identified by identification stations between the depalletizing station and the rack;
c) automatically storing the stock-keeping units in the rack from a first side of the rack;
d) at least partially automatically retrieving the stock-keeping units with a picker vehicle from a second side of the rack, wherein the retrieved stock-keeping units correspond to different goods, wherein the picker vehicle being designed to carry an outbound unit with a plurality of picked goods; and
e) stacking the stock-keeping units retrieved by the picker vehicle according to a picking sequence and a stacking sequence provided by an information technology system onto a load carrier arranged on the picker vehicle,
wherein the information technology system is programmed to work out the picking sequence from an order and then guide the corresponding picker vehicle to corresponding storage locations of the rack and wherein the information technology system specifies the sequence of goods to be stacked in succession on the load carrier to form the outbound unit,
and wherein the load carrier and stock-keeping units together form the outbound unit, with the picked goods being arranged on the load carrier or a stack already formed on the load carrier carried on the picker vehicle during a journey of the picker vehicle to the storage locations in the rack in a picking process.

14. The method in accordance with claim 13, wherein:
the method is utilized to pick a totality of goods or to carry out a number of picking process;
and wherein at least 80% of the totality of goods to be picked can be retrieved by a single picker vehicle or at least 80% of the number of picking process can be accomplished by the picker vehicle.

15. The method in accordance with claim 13, wherein:
during depalletizing, at least part of the goods are arranged on load carriers.

16. The method in accordance with claim 15, wherein:
the load carrier comprises at least one of a pallet, a single-layer or multiple layer tray, a single tray, and a container.

17. The method in accordance with claim 13, wherein:
the load carrier comprises at least one of a pallet, a roll container, a single container, multiple containers on a containerboard, and a transport rack.

* * * * *